Feb. 24, 1953 G. L. PEARSON 2,629,800

SEMICONDUCTOR SIGNAL TRANSLATING DEVICE

Filed April 15, 1950

INVENTOR
G. L. PEARSON

BY [signature]

ATTORNEY

Patented Feb. 24, 1953 2,629,800

UNITED STATES PATENT OFFICE 2,629,800

SEMICONDUCTOR SIGNAL TRANSLATING DEVICE

Gerald L. Pearson, Millington, N. J., assignor to Bell Telephone Laboratories, Incorporated, New York, N. Y., a corporation of New York Application April 15, 1950, Serial No. 156,188

4 Claims. (Cl. 201—63)

This invention relates to semiconductor signal translating devices and more particularly to germanium rectifiers and photocells.

One general object of this invention is to attain improved performance characteristics for semiconductor signal translating devices and more particularly for rectifiers and photosensitive germanium elements.

Another object of this invention is to simplify the structure and facilitate the fabrication of germanium translating devices.

A further object of this invention is to increase the current carrying capacity of germanium rectifiers.

In one illustrative embodiment of this invention, a translating device comprises a body of P conductivity type germanium having on one major face thereof a thin skin, say of the order of one-half mil to a few mils thick, of N conductivity type germanium, and a large area substantially ohmic connection to the body at a region spaced from the skin, for example to the face opposite the skin. The interface or junction between the body and skin has asymmetric conducting characteristics, and further, exhibits photoelectric properties.

In a rectifier including such a body, a large area ohmic connection is provided to the skin. A particularly advantageous performance characteristic of such rectifier is the large forward current flow obtainable at low voltages. In one typical device, a forward current of about 100 milliamperes obtains at a potential of about 0.25 volt.

In a photocell utilizing a germanium body of the construction above set forth, a connection, which may be ohmic or rectifying is made to the N-type skin, and light is directed against the outer face of this skin. Substantial photocurrents are obtained between the point contact and the large area connection to the body, the current amplitude being a function of the intensity and wavelength of the incident light. In one typical device, maximum response is obtained for light wavelengths of about 1.5 microns.

The invention and the several features thereof will be understood more clearly and fully from the following detailed description with reference to the accompanying drawing in which.

Figure 1:
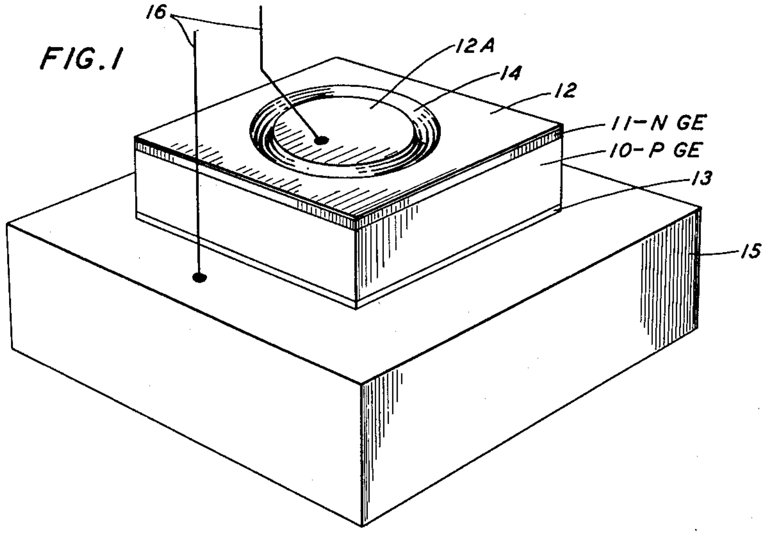
Fig. 1 is a perspective view of a rectifier illustrative of one embodiment of this invention.

In the drawing, in the interest of clarity, the rectifier and photocell have been shown to a greatly enlarged scale. The magnitude of the enlargement will be appreciated from the dimensions of typical devices given hereinafter.

Referring now to the drawing, the rectifier illustrated in Fig. 1 comprises a body 10 of P conductivity type germanium, having on one major face thereof an integral thin film or skin 11 of N conductivity type germanium. Ohmic connections 12 and 13, for example of rhodium plating, are made to the skin 11 and the opposite face of the body 10, respectively. One face portion of the germanium body has therein an annular groove 14 which extends through the plating 12, skin or film 11, and into the body 10, thereby to produce an N-type island having the ohmic connection 12A thereto.

The germanium body is mounted upon a conductive block 15, for example of brass, to which it may be joined as by soldering of the plating 13 thereto. Conductors 16 are connected to the electrode 12A and block 15 and constitute the terminals of the rectifier.

The P-type germanium body 10 may be cut from ingots produced, for example, in the manner described in the application Serial No. 638,351, filed December 29, 1945, now Patent 2,602,211, granted July 8, 1952, of J. H. Scaff and H. C. Theuerer. In a typical device, the germanium body 10 was 0.1 inch on a side and 0.025 inch thick, and the skin or film 11 thereon was .002 inch thick. The groove 14 had an inner diameter of 0.046 inch and was 0.01 inch deep.

The skin or film 11 may be formed upon the body 10 by subjecting the body to a prolonged heat treatment. For example, in the typical device above described, the film 11 was formed by heating an N-type body for a period of twenty-four hours at 900° C. in an atmosphere of commercial helium following which the body was cooled rapidly to room temperature. Such heat treatment results in the formation of a P-type body having an N-type film on all surfaces.

In the fabrication of the device, the N-type film or skin is removed from one of the major faces of the body, as by lapping with 600-mesh Carborundum and water, and the electrodes or connections 12 and 13 are applied. Then the face having the plating 12 thereon is coated with a ceresin wax, and the groove 14 in cut. Following this, the surface of the groove advantageously is etched, for example, with an etchant composed of 10 c. c. of nitric acid, 5 c. c. of hydrofluoric acid, 200 milligrams of copper nitrate, and 10 c. c. of water. Such treatment of the groove surfaces, it has been found, improves the reverse resistance of the N-P junction between the film 11 and the body 10.

Figure 2:
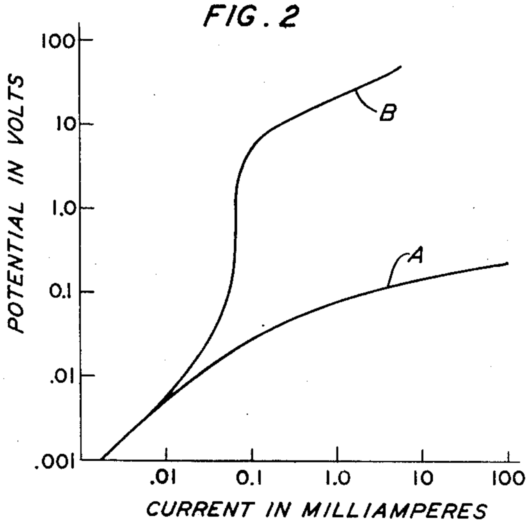
Fig. 2 is a graph illustrating typical operating characteristics of a rectifier of the construction shown in Fig. 1.

Typical performance characteristics of a rectifier of the construction above described are depicted in Fig. 2, wherein curve A illustrates the current-voltage relationship for the forward direction of current flow, and curve B indicates this relationship for the reverse direction. Particularly to be noted from the characteristics presented in Fig. 2 is the high current carrying capacity in the forward direction at relatively low voltage levels. For example, it will be noted that for a potential of .03 volt, the forward current is 0.1 milliampere. Inasmuch as the area of the P–N junction above mentioned is 0.0107 square centimeter, it will be appreciated that the current carrying capacity at the voltage given is 9.33 milliamperes per square centimeter. For a potential of 0.25 volt, the current is 933 milliamperes per square centimeter.

It will be noted further that the rectifier is operable in the reverse direction up to about 45 volts. The resistance at low voltages for the typical device is approximately 550 ohms, which, for the dimensions given, corresponds to a resistance of about 5 ohms per square centimeter.

Figure 3:
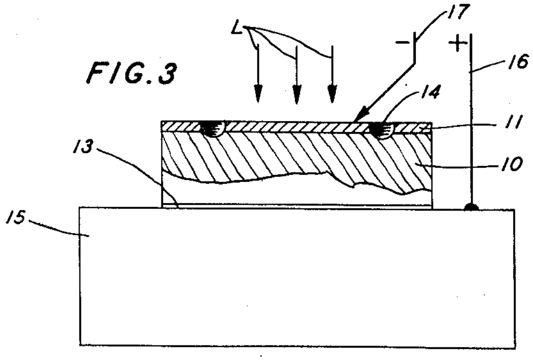
Fig. 3 is an elevational view, partly in section, of a photocell illustrative of another embodiment of this invention.

The invention may be embodied also in photocells, a typical structure for this purpose being illustrated in Fig. 3. The body 10 with the film 11 thereon is of the same construction and may be fabricated in the same manner as in the rectifier described hereinabove. In the photocell, however, the ohmic connection 12A to the N conductivity type skin or film 11 is omitted, and electrical contact is made to the island of N-type material by a point contact 17, which may be, for example, of Phosphor bronze. Light, indicated by the arrows L in Fig. 3, is directed against the outer face of the N conductivity type island, that is, the area within the groove 14. The photovoltage produces the polarities indicated in Fig. 3. Advantageously, the film 11 is made extremely thin, for example about 0.0005 inch thick. Such a thin film may be obtained by heating the P-type body for an appropriate period at the temperature and in an atmosphere of the type heretofore set forth.

Dimensionwise, the photocell illustrated in Fig. 3 may be the same as the rectifier illustrated in Fig. 1.

Figure 4:
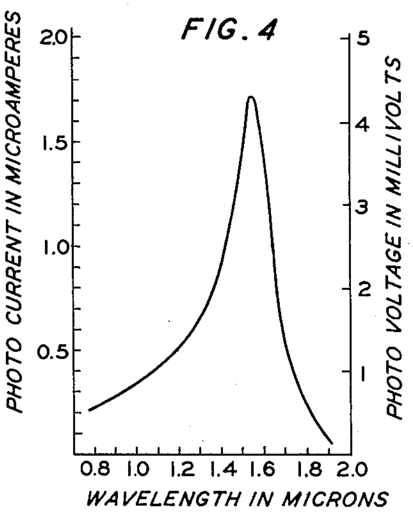
Fig. 4 is a graph depicting a performance characteristic of a typical device of the construction illustrated in Fig. 3.

A typical performance characteristic for a photocell of the construction illustrated in Fig. 3 is presented in Fig. 4. For this curve, the photovoltage and photocurrent are presented as ordinates as a function of the wavelength for a constant energy of illumination of $1.4 \times 10^{-3}$ watts per square centimeter. The maximum response, it will be noted, obtains for a wavelength of about 1.5 microns.

Although specific embodiments of this invention have been shown and described, it will be understood that they are but illustrative and that various modifications may be made therein without departing from the scope and spirit of this invention.

What is claimed is:

1. An asymmetric electrical translating device comprising a body of P conductivity type germanium having on one surface thereof an integral skin of N conductivity type germanium of the order of 0.002 inch thick, a large area ohmic connection to said body, and an ohmic connection to the outer face of said skin and substantially coextensive therewith.

2. The method of fabricating an asymmetric electrical translating device which comprises heating a body of N-type germanium to convert all of said body except a skin portion thereof to P-type material, cutting a closed groove in one face of said body through the skin thereon and into said body, etching the bounding surfaces of said groove, and making electrical connections to said body and to the skin portion bounded by said groove.

3. The method of making an asymmetric electrical translating device which comprises heating a body of germanium of one conductivity type to convert all of the body except a thin surface film to germanium of the opposite conductivity type, forming a groove extending through said film, in one face of said body, thereby to form an island of said one conductivity type on said face, removing said film from another face of said body, and forming substantially ohmic connections upon said island and said another face.

4. An electrical translating device comprising a body of P conductivity type germanium having on one surface thereof an integral skin of N conductivity type germanium, said body having also therein a closed groove extending through said skin, thereby defining an N conductivity type island on said P-type body, a substantially ohmic connection to said body, and a connection to said island.

GERALD L. PEARSON.

REFERENCES CITED

The following references are of record in the file of this patent:

UNITED STATES PATENTS

| Number | Name | Date |
|---|---|---|
| 2,504,628 | Benzer | Apr. 18, 1950 |

OTHER REFERENCES

Bidwell's Germanium, Physical Review, vol. XIX, No. 5, May 1922, pages 447–455.

Cornelius' Germanium Diodes, Electronics, February 1946, pages 118–123.

Dunlap, Germanium, G. E. Review, February 1949, pages 9–17.